United States Patent
Xiao et al.

(10) Patent No.: US 10,190,512 B2
(45) Date of Patent: Jan. 29, 2019

(54) MANIFOLD VOLUME DETERMINATION BASED ON SURGE FREQUENCY

(71) Applicant: Ford Global Technologies, LLC, Dearborn, MI (US)

(72) Inventors: Baitao Xiao, Canton, MI (US); Hamid-Reza Ossareh, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 565 days.

(21) Appl. No.: 14/939,790

(22) Filed: Nov. 12, 2015

(65) Prior Publication Data

US 2017/0138279 A1    May 18, 2017

(51) Int. Cl.

| F02D 23/00 | (2006.01) |
|---|---|
| F02D 41/00 | (2006.01) |
| F02B 37/12 | (2006.01) |
| F02B 37/18 | (2006.01) |
| F02D 29/04 | (2006.01) |
| F02M 35/10 | (2006.01) |
| F02D 41/18 | (2006.01) |
| F02D 41/24 | (2006.01) |

(52) U.S. Cl.
CPC ........ *F02D 41/0007* (2013.01); *F02B 37/127* (2013.01); *F02B 37/18* (2013.01); *F02D 23/00* (2013.01); *F02D 29/04* (2013.01); *F02D 41/182* (2013.01); *F02D 41/2438* (2013.01); *F02M 35/10157* (2013.01); *F02B 2037/122* (2013.01); *F02D 2200/0402* (2013.01); *F02D 2200/0406* (2013.01); *F02D 2200/0414* (2013.01); *F02D 2400/11* (2013.01); *Y02T 10/144* (2013.01)

(58) Field of Classification Search
CPC ............... F02D 41/0007; F02D 41/182; F02D 41/2438; F02D 23/00; F02D 29/04; F02D 2200/0402; F02D 2200/0406; F02D 2200/0414; F02B 2037/122; F02B 2037/125
USPC ......................................... 60/602, 611, 605.1
See application file for complete search history.

(56) References Cited

U.S. PATENT DOCUMENTS

| 3,963,367 A | 6/1976 | Stalker et al. |
|---|---|---|
| 5,199,856 A | 4/1993 | Epstein et al. |
| 5,331,936 A | 7/1994 | Messih et al. |
| 9,174,637 B2 | 11/2015 | Banker et al. |
| 9,810,229 B2 * | 11/2017 | Banker ............... F02D 41/0007 |

(Continued)

OTHER PUBLICATIONS

Xiao, Baitao et al., "Methods and Systems for Real-Time Compressor Surge Line Adaptation," U.S. Appl. No. 14/563,749, filed Dec. 8, 2014, 53 pages.

(Continued)

*Primary Examiner* — Ngoc T Nguyen
(74) *Attorney, Agent, or Firm* — Julia Voutyras; McCoy Russell LLP

(57) ABSTRACT

Methods and systems are provided for determining a cylinder air charge based on a boost manifold volume of an engine. In one example, a method may include inducing a compressor surge event, and updating the boost manifold volume in response to a difference between an actual surge pressure and an expected surge pressure. The method further includes determining the cylinder air charge based on the updated boost manifold volume.

20 Claims, 3 Drawing Sheets

(56) References Cited

U.S. PATENT DOCUMENTS

| 9,816,447 B2* | 11/2017 | Jankovic ............ F02D 41/0007 |
| 2013/0111901 A1 | 5/2013 | Leone et al. |
| 2014/0047833 A1 | 2/2014 | Buckland et al. |
| 2014/0260241 A1 | 9/2014 | Jankovic et al. |
| 2015/0101327 A1 | 4/2015 | Clark et al. |

OTHER PUBLICATIONS

Hellstrom, John Erik Mikael et al., "Method and System for Surge Control," U.S. Appl. No. 14/853,354, filed Sep. 14, 2015, 44 pages.

Greitzer, E. M., "Surge and Rotating Stall in Axial Flow Compressors—Part I: Theoretical Compression System Model," Journal of Engineering for Power, vol. 98, pp. 190-198, Apr. 1976.

Greitzer, E. M., "The Stability of Pumping Systems—The 1980 Freeman Scholar Lecture," Journal of Fluids Engineering, Transactions of the ASME, vol. 103, pp. 193-242, Jun. 1981.

* cited by examiner

MANIFOLD VOLUME DETERMINATION BASED ON SURGE FREQUENCY

FIELD

The present description relates generally to methods and systems for estimating a cylinder air charge of a turbocharged engine.

BACKGROUND/SUMMARY

Determining an amount of air entering an engine, and in particular an amount of air in cylinders of the engine, may be useful for various aspects of engine control. For example, the fuel control and fuel delivery may be coordinated based on a cylinder air charge to maintain a desired air to fuel ratio (AFR). Engine systems may be configured with boosting devices, such as turbochargers or superchargers, for providing a boosted cylinder air charge and improving peak power outputs. The cylinder air charge depends on a boost manifold volume of the engine system. As the boost manifold volume increases, it takes more time for the boosted intake air held in the intake boost manifold to enter the cylinder. Conversely, as the boost manifold volume decreases, the boosted intake air may enter the cylinder faster. Thus, accurate estimation of the boost manifold volume may affect determination of the cylinder air charge, and thus fuel injection.

Other attempts to address estimating cylinder air charge in an engine include calculating the cylinder air charge based on a manifold filling model. One example approach is shown by Messih et al. in U.S. Pat. No. 5,331,936 A. Therein, the cylinder air charge is predicted based on parameters including previous cylinder air charge, manifold volume, engine speed, manifold pressure, and engine displacement.

However, the inventors herein have recognized potential issues with such methods. As one example, Messih et al. assumes that the manifold volume is constant. However, customer installed aftermarket boost manifold components may alter the boost manifold volume. Without a proper strategy to compensate for changes in the boost manifold volume, cylinder air charge may not be accurately estimated, which may lead to deteriorated engine performance. Still other situations may affect manifold volume.

In one example, the issues described above may be addressed by a method for an engine comprising: updating a boost manifold volume in response to a difference between an expected surge frequency and a measured surge frequency; and adjusting engine operating parameters responsive to the updated boost manifold volume. In this way, engine boost manifold volume may be updated while operating the engine.

As one example, during an engine surge event, the method calculates an expected surge frequency based on a known or currently estimated boost manifold volume. The method also monitors sensor outputs and determines an actual surge frequency. By comparing the expected surge frequency and the actual surge frequency, the method may determine if there is a change in boost manifold volume and may update the boost manifold volume if necessary. Based on the updated boost manifold volume, a more accurate cylinder air charge may be estimated. Engine operating parameters, such as a fuel injection amount as controlled via electronically actuated fuel injectors of the engine, may be calculated based on the estimated cylinder air charge. The technical effect of updating the boost manifold volume during a compressor surge event is that less offline calibration may be required in response to a change in the boost manifold volume and further that the system can automatically accommodate such changes and compensate for them in real-time. The technical effect of updating engine operating parameters responsive to the updated boost manifold volume is that that deterioration in engine performance due to a change in boost manifold volume may be reduced. Moreover, in some examples, the method requires no special equipment dedicated to estimating the boost manifold volume.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
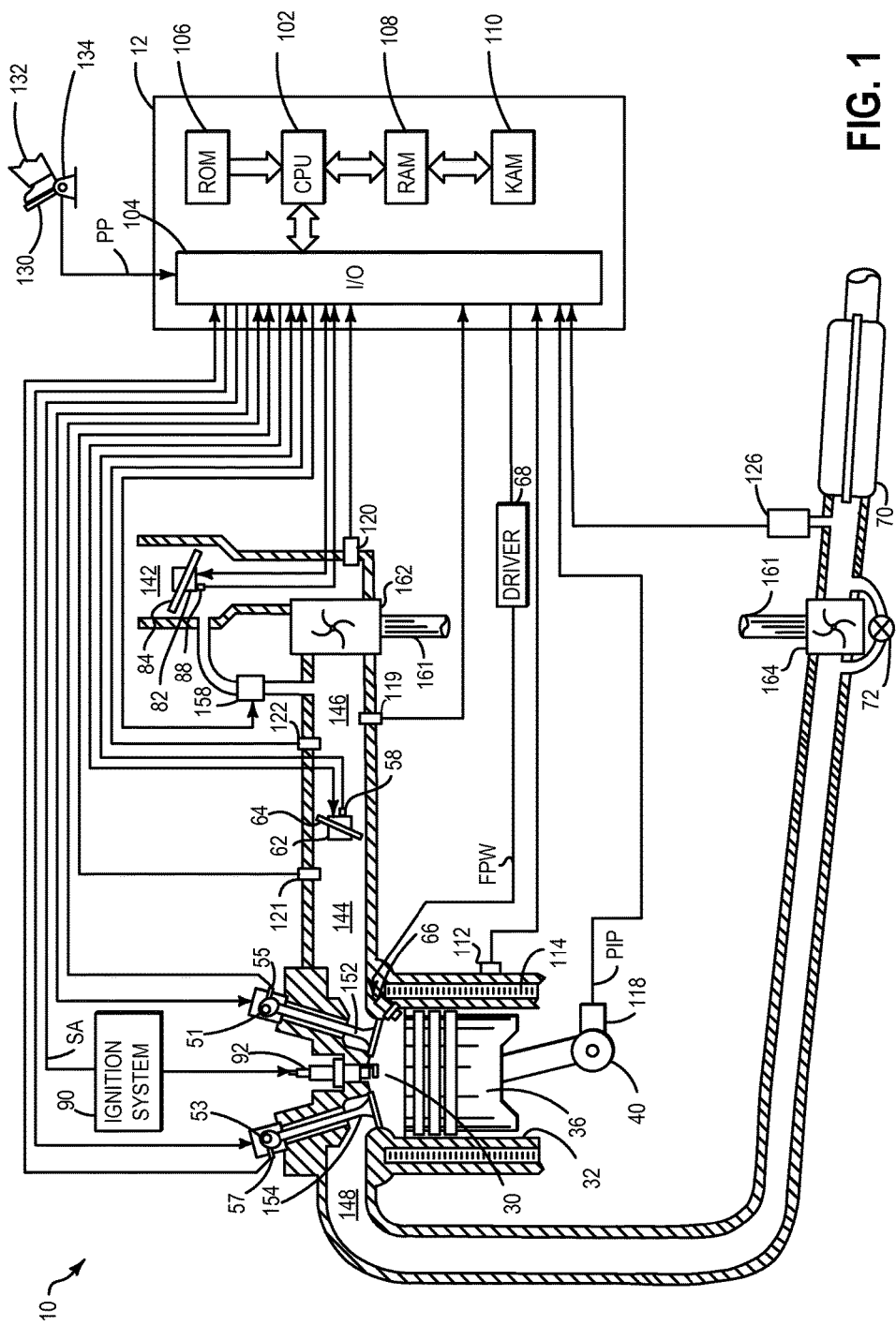
FIG. 1 shows an example turbocharged engine system.

The following description relates to systems and methods for determining a boost manifold volume in a turbocharged engine system shown in FIG. 1 and adjusting engine operating parameters based on the determined boost manifold volume. An example method shown in FIG. 2 by calculates an expected surge frequency and measures an actual surge frequency during an engine surge event. In response to a difference between the expected surge frequency and the actual surge frequency, the controller may be configured to estimate the actual boost manifold volume and update a cylinder air charge. As such, engine operating parameters may be updated for improved performance. FIG. 3 demonstrates operation of engine actuators according to the method shown in FIG. 2 and the changes of engine parameters over time responsive to the operation.

FIG. 1 illustrates a schematic diagram showing one cylinder of a multi-cylinder engine system 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system including a fuel tank, fuel pump, and fuel rail. Fuel injector 66 is supplied with operating current from driver 68 which responds to controller 12. In addition, intake manifold 144 is shown communicating with electronic throttle 62 which adjusts a position of throttle plate 64 to control airflow to engine cylinder 30. This may include controlling airflow of boosted air from intake boost chamber 146. Temperature sensor 119 and pressure sensor 122 may be coupled to the intake boost chamber for measuring the boost temperature and the boost pressure. Throttle 62 may be electrically controlled and its position may be adjusted based on optional position sensor 58. A boost manifold volume may be defined as the volume of intake boost chamber 146, between throttle 62 and compressor 162. A single air intake system throttle (AIS throttle) 82 is coupled to air intake passage 142 and located upstream of the intake boost chamber 146. Throttle plate 84 controls air pressure at inlet of compressor 162. The AIS throttle may be electrically controlled and its position may be adjusted based on optional position sensor 88.

Compressor 162 draws air from air intake passage 142 to supply boost chamber 146. In some examples, air intake passage 142 may include an air box (not shown) with a filter. Exhaust gases spin turbine 164 which is coupled to compressor 162 via shaft 161. Pressure sensor 122 is coupled to intake boost chamber 146 for measuring the boost pressure. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or opening may be decreased) in response to increased boost demand, such as during an operator pedal tip-in. By closing the wastegate, exhaust pressures upstream of the turbine can be increased, raising turbine speed and peak power output. This allows boost pressure to be raised. In another example, wastegate 72 may be opened (or opening may be increased) in response to decreased boost demand, such as during an operator pedal tip-out. By opening the wastegate, exhaust pressures can be reduced, reducing turbine speed and power. This allows boost pressure to be lowered.

Compressor recirculation valve 158 (CRV) provides a path around compressor 162 so that air may move from the compressor outlet to the compressor inlet so as to reduce a pressure that may develop across compressor 162. CRV 158 may be opened and closed via an electric signal from controller 12. In some embodiments, CRV 158 may be adjustable to one of a fully open or a fully closed position. In other embodiments, CRV 158 may be configured like a throttle such that its position is variable to any position between a fully open and a fully closed position. By actuating CRV 158 (alone or in coordination with wastegate 72), a boost pressure can be rapidly controlled. For example, CRV 158 may be closed (or opening may be decreased) in response to increased boost demand, such as during an operator pedal tip-in. By closing the CRV, a larger proportion of boosted air charge is delivered to the engine intake manifold, raising turbine engine peak power output. This allows boost levels to be raised. In another example, CRV 158 may be opened (or opening may be increased) in response to decreased boost demand, such as during an operator pedal tip-out. By opening the CRV, boost pressure can be dumped upstream of the compressor, reducing boost pressure and boost levels. In addition, by opening CRV, compressor surge can be reduced. For example, when an operator tips-out of an accelerator pedal, and AIS throttle 82 closes to reduce airflow, an increased pressure differential can be created across the compressor. This leads to reduced forward flow through the compressor (compressor surge), degrading turbocharger performance. Herein, by opening CRV 158, the pressure differential across the compressor is reduced, moving the compressor ratio (or compressor flow) away from a surge limit or surge region.

Ignition system 90 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 70. Alternatively, a two-state exhaust gas oxygen sensor may be substituted for UEGO sensor 126.

Converter 70 may include multiple catalyst bricks, in one example. In another example, multiple emission control devices, each with multiple bricks, can be used. Converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position from a throttle position sensors 58 and 88; intake manifold pressure signal from sensor 121; boost pressure signal from sensor 122; and boost temperature signal from sensor 119. Engine speed, RPM, may be generated by controller 12 from signal PIP. Controller 12 employs the various actuators of FIG. 1 to adjust engine operation based on the received signals and instructions stored on a memory of the controller.

Storage medium read-only memory 106 can be programmed with computer readable data representing non-transitory instructions executable by processor 102 for performing the methods described below as well as other variants that are anticipated but not specifically listed. For example, adjusting an amount of injected fuel may include adjusting an actuator of the fuel injector. Adjusting intake air flow or boost pressure may include adjusting one or more actuators for the wastegate or the CRV.

As described above, FIG. 1 shows only one cylinder of a multi-cylinder engine, and each cylinder may similarly include its own set of intake/exhaust valves, fuel injector, spark plug, etc.

Figure 2:
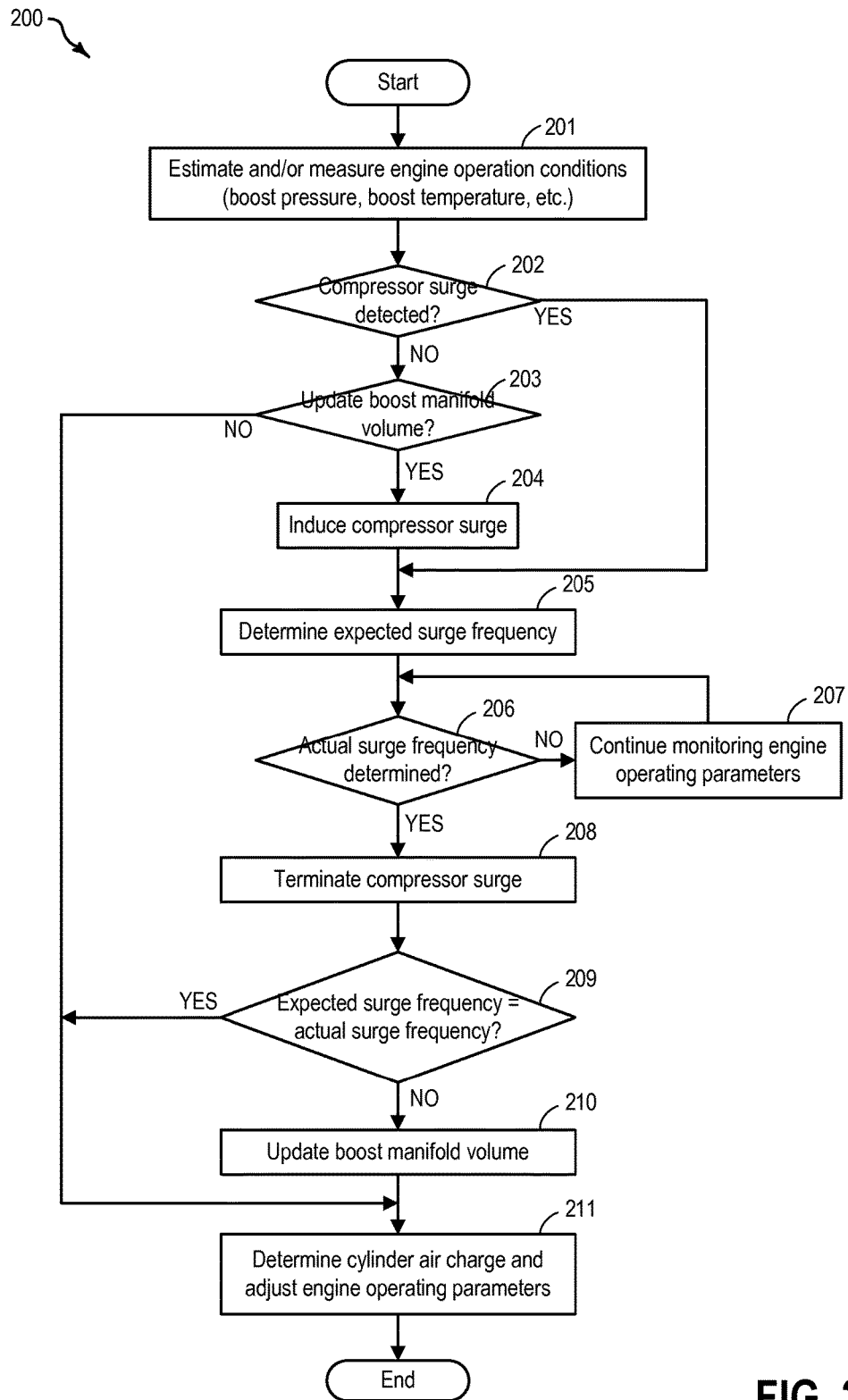
FIG. 2 shows an example method of determining a boost manifold volume based on compressor surge frequency.
Figure 3:
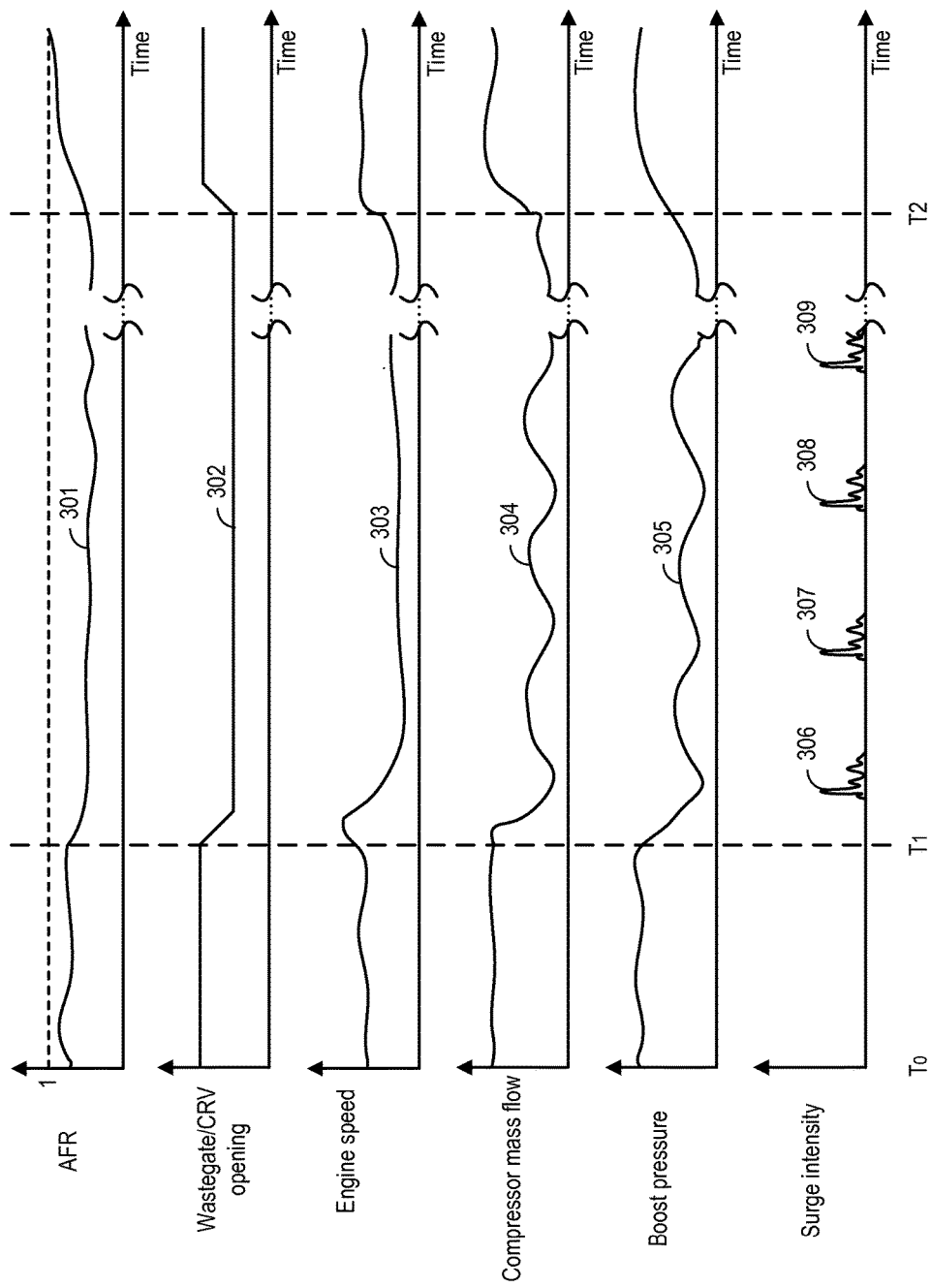
FIG. 3 shows an example of operating engine actuators according to the method and changes in engine parameters in response to the operation.

FIG. 2 shows an example method 200 of estimating a cylinder air charge of the engine system shown in FIG. 1. The method includes determining whether there is a change in the boost manifold volume based on the comparison of an actual surge frequency to an expected surge frequency. The compressor surge event may be caused passively, for example during an operator tips-out of an accelerator pedal. The compressor surge event may alternatively be actively induced by operating the wastegate and/or the CRV. If the actual surge frequency is different from the expected surge frequency, the method updates the manifold volume and corrects the cylinder air charge. The method may further adjust engine operating parameters based on the corrected cylinder air charge for improved vehicle performance. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 201, the method includes estimating and/or measuring engine operating conditions such as boost pressure, boost air temperature, and mass air flow. The boost pressure may be measured by a pressure sensor coupled to the intake boost chamber downstream of the compressor (such as pressure sensor 122 in FIG. 1). The boost air temperature sensor may be measured by a temperature sensor coupled to the intake boost chamber downstream of the compressor (such as temperature sensor 119 in FIG. 1). The mass air flow through the compressor may be measured by a sensor coupled upstream of the compressor (such as sensor 120 in FIG. 1). Still other parameters may be determined based on the output of corresponding sensors. These may include, for example, engine speed, air-fuel ratio, intake manifold pressure, manifold airflow, compressor inlet pressure, compressor inlet temperature, throttle charge temperature, intake air temperature, and engine temperature, etc. Method may further estimate current and future road roughness based on vibration of the vehicle and/or the know road conditions. The engine operation conditions may be continuously monitored and stored in a controller.

At 202, the method determines if the compressor is under surge. During selected conditions, such as during an operator tip-out, due to a decreased flow through the compressor when the throttle is closed, compressor surge may occur when the engine goes from engine operation with boost to engine operation without boost. In an example, compressor surge event may be detected in response to oscillations of the mass air flow to the compressor or oscillations of the boost pressure. In another example, a surge intensity may be calculated from the boost pressure. If the compressor is under surge, method 200 goes to step 205. If no compressor surge is detected, method 200 goes to step 203.

At step 203, method 200 determines if there is a need to update boost manifold volume. Boost manifold volume is defined as the volume of the intake boost chamber (such as intake boost chamber 146 in FIG. 1). The boost manifold volume may be different from a known boost manifold volume due to installing aftermarket boost manifold components. If a controller of the engine determines that there is a possibility of change in boost manifold volume, it may initiate the process of updating the boost manifold volume. In another example, the controller may update the boost manifold volume after certain time period. If method 200 determines to update the boost manifold volume, the method moves to step 204. If method 200 determines not to update the boost manifold volume, the method moves to step 211.

At step 204, method 200 induces a compressor surge event in response to a request of updating the boost manifold volume. The compressor surge may be induced by operating a CRV and/or a wastegate (such as CRV 158 and wastegate 72 in FIG. 1). As an example, the opening of the CRV and/or the wastegate may be decreased to increase the air flow rate through the compressor and/or the turbine. As another example, the CRV and/or the wastegate may be closed to increase the air flow rate through the compressor and/or the turbine. The compressor surge may be induced when the engine is operating under certain operating conditions. In an example, compressor surge may be induced when the AFR of engine is rich. In another example, compressor surge may be induced when the noise from the vehicle is high. Vehicle noise may be high when the vehicle is traveling on a rough road. In yet another example, compressor surge may be induced when discharging the fuel vapor.

At step 205, an expected surge frequency may be calculated based on the boost pressure, the boost air temperature, and a known boost manifold volume. The boost pressure and boost air temperature are measured right before the detected surge event at step 202 or right before inducing the surge event at step 204. The known boost manifold volume is a boost manifold volume stored in the controller.

As an example, the expected surge frequency may be determined by a model-based diagnostic method. The model structure is based on combination of manifold filing dynamics and surge model. The compressor surge model may be expressed based on the Moore Greitzer model:

$$\dot{w}_{corr} = \frac{A}{L}(P_b^* - P_b), \quad (1)$$

wherein $\dot{w}_{corr}$ is corrected compressor mass flow rate, A is equivalent air induction system (AIS) cross section area, L is equivalent AIS length, $P_b$ is transient boost pressure, and $P_b^*$ is boost pressure at equilibrium. The manifold filling dynamics may be expressed based on the ideal gas law:

$$\dot{P}_b = \frac{RT_b}{V_b}(\dot{w}_{corr} - \dot{m}_{thr}), \quad (2)$$

wherein R is the gas constant, $T_b$ is the boost air temperature at equilibrium, $V_b$ is the boost manifold volume, $\dot{w}_{corr}$ is corrected compressor mass flow rate, and $\dot{m}_{thr}$ is throttle mass flow rate. Flow through the throttle between the intake boost chamber and the intake manifold may be expressed with the orifice equation:

$$\dot{m}_{thr} = C_D A(\theta) \frac{P_b}{\sqrt{RT_b}} \varphi(P_b, P_i), \quad (3)$$

wherein $C_D$ is discharge coefficient, $A(\theta)$ is effective throttle opening area, and $\varphi(P_b)$ is $$\varphi = \begin{cases} \left(\frac{P_i}{P_b}\right)^{\frac{1}{\gamma}} \sqrt{\frac{2\gamma}{\gamma-1}\left(1 - \left(\left(\frac{P_i}{P_b}\right)^{\frac{\gamma-1}{\gamma}}\right)\right)}, & \frac{P_i}{P_b} > 0.5283 \\ \sqrt{\gamma\left(\frac{2}{\gamma+1}\right)^{\frac{\gamma+1}{\gamma-1}}}, & \frac{P_i}{P_b} < 0.5283 \end{cases} \quad (4)$$

where $P_i$ is intake manifold pressure, and $P_b$ is boost manifold pressure.

Linearizing equations (1), (2), and (3), one may get a second order linearized observer model:

$$\begin{bmatrix} \delta\dot{w}_{corr} \\ \delta\dot{P}_b \end{bmatrix} = \begin{bmatrix} \frac{A}{L}\frac{\delta P_b^*}{\delta\dot{w}_{corr}} & -\frac{A}{L} \\ \frac{RT_b}{V_b} & -\left(\frac{C_D A^*(\theta)}{\sqrt{RT_b}}\varphi^*(P_b) + \frac{\delta\varphi(P_b)}{\delta P_b}\frac{P_b^* C_D A^*(\theta)}{\sqrt{RT_b}}\right) \end{bmatrix} \quad (5)$$

-continued $$\begin{bmatrix} \delta \dot{w}_{corr} \\ \delta P_b \end{bmatrix} + \begin{bmatrix} 0 \\ \frac{\delta P_b}{\sqrt{RT_b}} \varphi^*(P_b) \end{bmatrix} \delta C_D A(\theta),$$

Then, the natural frequency $\omega_n$ of the model in equation (5) may be solved as:

$$\omega_n = \frac{A}{L} \left[ \frac{RT_b}{V_b} - \frac{\delta P_b^*}{\delta \dot{w}_{corr}} \left( \frac{C_D A^*(\theta)}{\sqrt{RT_b}} \varphi^*(P_b) + \frac{\delta \varphi(P_b)}{\delta P_b} \frac{P_b^* C_D A^*(\theta)}{\sqrt{RT_b}} \right) \right], \quad (6)$$

wherein A/L is a calibrated parameter that may be obtained through system identification. As such, frequency of the pressure oscillation during surge (i.e. surge frequency) may be determined based on a boost pressure $P_b$, boost air temperature $T_b$, and boost manifold volume $V_b$.

At step 206, method 200 determines if an actual surge frequency may be determined. Actual surge frequency may be calculated based on the frequency analysis of the oscillations of the mass air flow to the compressor, oscillations of the boost pressure, or the surge intensity over time. In an example, in response to compressor surge, the mass air flow and/or the boost pressure are monitored and recorded over time. The actual surge frequency is determined by calculating oscillation frequency of the mass air flow and/or the boost pressure. In another example, surge intensity may first be calculated based on the boost pressure. Then, surge frequency is determined based on the frequency of surge intensity. If the surge frequency may not be reliably determined, method 200 moves to step 207, wherein method 200 continuously monitors the engine operating parameters. If the surge frequency may be reliably determined at step 206, method 200 moves to step 208.

At step 208, method 200 terminates compressor surge. The compressor surge may be terminated by operating the wastegate and/or the CRV. For example, the opening of the wastegate and/or the CRV may be increased to reduce the rotation speed of the turbine and/or reduce the pressure across the compressor.

At step 209, method 200 compares the expected surge frequency calculated at step 205 and the actual surge frequency calculated at step 206. If the expected surge frequency equals to the actual surge frequency, method 200 moves to step 211. If the expected surge frequency is different from the actual surge frequency, method 200 moves to 210.

At 210, the boost manifold volume is updated. As an example, the updated boost manifold volume may be determined based on the difference between the expected surge frequency and the actual surge frequency. As another example, the updated boost manifold volume may be calculated based on the actual surge frequency, the boost pressure, and the boost air temperature through equation (4).

At 211, method 200 determines the cylinder air charge based on the boost manifold volume and adjusts engine operating parameters. The engine operating parameters may be adjusted based on the boost manifold volume, or the determined cylinder air charge. The engine operating parameters may include a fuel injection amount, ignition timing, AFR, intake mass air flow, and boost pressure.

FIG. 3 demonstrates operations of engine actuators according to the method and changes in engine parameters in response to the operations. The x-axis of FIG. 3 is time and the time increases as indicated by the arrow. From time T0 to time T1, the engine is under normal operation. At time T1, compressor surge occurs. The compressor surge may be caused by the operator tip-out of the accelerator pedal. In another example, the compressor surge may be induced by a request to update the boost manifold volume. The update may be requested when the AFR of the engine is rich as shown in 301. The update may also be requested when the noise from the vehicle is higher than a threshold. For example, the compressor surge may be initiated in response to a rough road or during fuel vapor purging. The compressor surge may be induced actively by decreasing the opening of the wastegate and/or the CRV as shown in 302. In response to surge, engine speed is decreased as shown in 303. Oscillations in mass air flow (304) and the boost pressure (305) may also be observed due to compressor surge. Surge intensity may be calculated based on the boost pressure. As shown in 306-309, surge intensity peaks periodically. A controller may estimate an actual surge frequency by analyzing the frequency of the oscillations in the mass air flow, the boost pressure, or the surge intensity.

At time $T_2$, the controller determines that the surge frequency may be reliably determined and stops compressor surge. In an example, the compressor surge may be stopped by increasing the opening of the wastegate and/or the CRV. In response to the termination of compressor surge, engine speed increases. The oscillation in compressor mass air flow, boost pressure, and surge intensity are disappeared.

In this way, cylinder air charge may be accurately estimated taking account of the change in the boost manifold volume. The engine operating parameters may be adjusted based on the estimated cylinder air charge for improved engine operation. By updating the boost manifold volume during a compressor surge event, a change in boost manifold volume may be determined online during engine operation, and engine operating parameters may be automatically optimized based on the updated boost manifold volume. Further, by determining the boost manifold volume online while the engine is still operating, minimal interruption is brought to the engine operation.

As one embodiment, a method for an engine comprising: updating a boost manifold volume in response to a difference between an expected surge frequency and a measured surge frequency; and adjusting engine operating parameters responsive to the updated boost manifold volume. In a first example of the method, where the engine operating parameters include one or more of a fuel injection amount, an intake mass airflow, and a boost pressure. A second example of the method optionally includes the first example and further comprising inducing a compressor surge event. A third example of the method optionally includes one or more of the first and second examples, and further includes, wherein the compressor surge event is induced when an operator tips-out of an accelerator pedal. A fourth example of the method optionally includes one or more of the first through third examples, and further includes, wherein the compressor surge event is induced when a noise level of a vehicle is higher than a threshold. A fifth example of the method optionally includes one or more of the first through fourth examples, and further includes, wherein the measured surge frequency is determined by estimating a frequency of oscillations of a boost pressure based on a pressure sensor coupled downstream of a compressor. A sixth example of the method optionally includes one or more of the first through fifth examples, and further includes, wherein the measured surge frequency is determined by estimating a frequency of oscillations of a compressor mass flow based on a flow sensor coupled downstream of a compressor. A seventh example of the method optionally includes one or more of the first through sixth examples, and further includes, wherein the measured surge frequency is determined by estimating a frequency component of a surge amplitude. An eighth example of the method optionally includes one or more of the first through seventh examples, and further includes, wherein the expected surge frequency is determined based on a boost pressure, an intake air temperature, and a known boost manifold volume. A ninth example of the method optionally includes one or more of the first through eighth examples, and further includes, wherein the intake air temperature is measured with a temperature sensor coupled to an intake boost chamber of the engine.

In another representation, a method for an engine comprising: during a compressor surge event; determining an actual surge frequency; determining a boost manifold volume based on the actual surge frequency, a manifold boost pressure, and an intake air temperature; determining a cylinder air charge based on the boost manifold volume; and adjusting engine operating parameters based on the cylinder air charge. In a first example of the method, wherein the compressor surge event is induced while discharging a fuel vapor. A second example of the method optionally includes the first example and further includes, wherein the compressor surge event is induced when an air-to-fuel ratio of the engine is rich. A third example of the method optionally includes one or more of the first and second examples, and further includes, wherein the compressor surge event is induced when a vehicle is traveling on a rough road. A fourth example of the method optionally includes one or more of the first through third examples, and further includes, wherein the compressor surge event is induced by operating one more of a wastegate and a compressor bypass valve. A fifth example of the method optionally includes one or more of the first through fourth examples, and further includes, further comprising terminating the compressor surge event in response to successfully identifying the actual surge frequency.

In yet another representation, an engine system comprising: a turbocharger includes a compressor and a turbine; a compressor bypass valve for controlling a speed of the compressor; a wastegate for controlling a speed of the turbine; a pressure sensor coupled downstream of the compressor for sensing a boost pressure; a temperature sensor coupled to an intake boost chamber of an engine system for sensing an intake air temperature; and a controller configured with computer readable instructions stored on non-transitory memory for: inducing an compressor surge event; measuring an actual surge frequency; determining an expected surge frequency based on a boost manifold volume; updating the boost manifold volume based on a difference between the actual surge frequency and the expected surge frequency; and adjusting engine operating parameters responsive to the updated boost manifold volume. In a first example of the method, wherein the controller is configured for determining the expected surge frequency further based on a boost pressure and an intake air temperature. A second example of the method optionally includes the first example and further includes, wherein the controller is configured for inducing the compressor surge event by decreasing an opening of one or more of the wastegate and the compressor bypass valve. A third example of the method optionally includes one or more of the first and second examples, and further includes, wherein the controller is further configured for determining a cylinder air charge responsive to the updated boost manifold volume.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
   calculating an expected surge frequency via a model-based diagnostic utilizing a known boost manifold volume;
   calculating an actual surge frequency based on an output of a pressure sensor;
   updating the known boost manifold volume to an updated boost manifold volume based on a difference between the expected surge frequency and the actual surge frequency; and
   adjusting engine operating parameters responsive to the updated boost manifold volume, where adjusting the engine operating parameters includes one or more of adjusting a fuel injector actuator and adjusting a position of a throttle.

2. The method in claim 1, where the engine operating parameters include one or more of a fuel injection amount, an intake mass airflow, and a boost pressure.

3. The method of claim 1, further comprising inducing a compressor surge event.

4. The method of claim 3, wherein the compressor surge event is induced when an operator tips-out of an accelerator pedal.

5. The method of claim 3, wherein the compressor surge event is induced when a noise level of a vehicle is higher than a threshold.

6. The method of claim 1, wherein the actual surge frequency is determined by estimating a frequency of oscillations of a boost pressure from the output of the pressure sensor, and wherein the pressure sensor is coupled downstream of a compressor.

7. The method of claim 1, wherein the actual surge frequency is determined by estimating a frequency of oscillations of a compressor mass flow from an output of a compressor flow sensor, the compressor mass flow sensor coupled downstream of a compressor.

8. The method of claim 1, wherein the actual surge frequency is determined by estimating a frequency component of a surge amplitude.

9. The method of claim 1, wherein the model-based diagnostic further utilizes a boost pressure and an intake air temperature.

10. The method of claim 9, wherein the intake air temperature is measured with a temperature sensor coupled to an intake boost chamber of the engine.

11. A method for an engine comprising:
during a compressor surge event,
determining an actual surge frequency based on an output of a pressure sensor;
determining a boost manifold volume based on the actual surge frequency, a manifold boost pressure, and an intake air temperature;
determining a cylinder air charge based on the boost manifold volume; and
adjusting engine operating parameters based on the cylinder air charge, where adjusting the engine operating parameters includes adjusting one or more of a fuel injector actuator and a position of a throttle plate.

12. The method of claim 11, wherein the compressor surge event is induced while discharging a fuel vapor.

13. The method of claim 11, wherein the compressor surge event is induced when an air-to-fuel ratio of the engine is rich.

14. The method of claim 11, wherein the compressor surge event is induced when a vehicle is traveling on a rough road.

15. The method of claim 11, wherein the compressor surge event is induced by operating one more of a wastegate and a compressor bypass valve.

16. The method of claim 11, further comprising terminating the compressor surge event in response to determining the actual surge frequency.

17. An engine system comprising:
a turbocharger includes a compressor and a turbine;
a compressor bypass valve for controlling a speed of the compressor;
a wastegate for controlling a speed of the turbine;
a pressure sensor coupled downstream of the compressor for sensing a boost pressure;
a temperature sensor coupled to an intake boost chamber of an engine system for sensing an intake air temperature; and
a controller configured with computer readable instructions stored on non-transitory memory for:
inducing a compressor surge event;
calculating an actual surge frequency based on an output of the pressure sensor;
determining an expected surge frequency via a model-based diagnostic utilizing a known boost manifold volume;
updating the known boost manifold volume to an updated boost manifold volume based on a difference between the actual surge frequency and the expected surge frequency; and
adjusting engine operating parameters responsive to the updated boost manifold volume, where adjusting the engine operating parameters includes one or more of adjusting a fuel injector actuator and a position of a throttle plate.

18. The engine system of claim 17, wherein the model-based diagnostic further utilizes the boost pressure and the intake air temperature.

19. The engine system of claim 17, wherein the controller is configured for inducing the compressor surge event by decreasing an opening of one or more of the wastegate and the compressor bypass valve.

20. The engine system of claim 17, wherein the controller is further configured for determining a cylinder air charge responsive to the updated boost manifold volume.

* * * * *